2,911,993

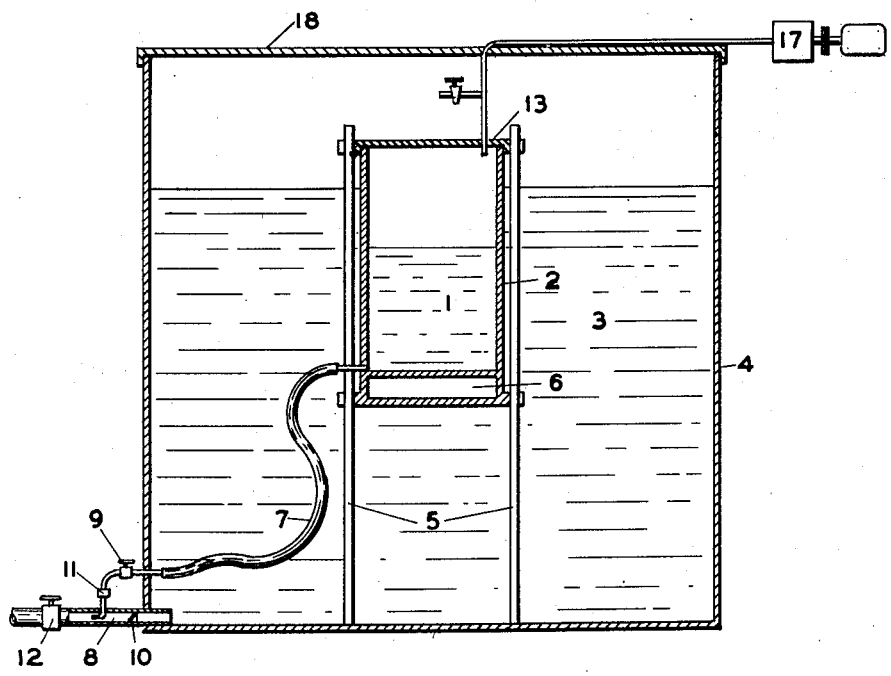

MEANS FOR MIXING LIQUIDS

William John Walker, Johannesburg, Transvaal Province, Union of South Africa

Application November 14, 1955, Serial No. 546,649

3 Claims. (Cl. 137—101.25)

This invention relates to means for the mixing of liquids in definite proportions during their discharge for use, and it is particularly useful in dispensing dosed drinking water for cattle.

Many devices have been suggested for use in mixing definite quantities of liquids but difficulties have been experienced owing to their being too delicate for farm work or too finely adjusted to handle anything but clear liquids. It is the object of this invention to provide a mixing or dosing means of simple and robust construction which is not liable to choking or clogging of the parts.

According to this invention there is provided a means for mixing liquids comprising two vessels, one for each liquid to be mixed, the vessel for the dosing liquid being floated in the vessel containing the liquid to be dosed, both vessels discharging simultaneously and separately into a common outlet.

Further features of this invention provide for the ratio of the dimensions of the discharge apertures for the two vessels to be variable, for different physical conditions to be applied to the two liquids and for the floated vessel to be provided with a float chamber.

In one preferred form for carrying out the invention two vessels are provided. The larger is positioned so that it may discharge into the drinking trough for the animals and the smaller vessel, for the dosing liquid, is adapted to float in the larger vessel.

It is convenient for the larger vessel to have a greater height than the floating vessel to allow vertical movement of the latter over a range depending on the facilities used for keeping up the supply of liquids to the respective vessels.

For the purpose of description reference is made to the accompanying drawing in which there is illustrated diagrammatically a preferred form of the invention with the dosing liquid vessel free to move in a vertical direction. The dosing liquid is indicated by the numeral 1 and is assumed to have a specific gravity greater than unity. In the embodiment shown it is contained in a vessel 2 which is adapted to float freely in the water or liquid 3 to be dosed and contained in the outer and larger vessel 4. If desired suitable vertical guides 5 may be provided to constrain the movement of the vessel 2 and an air chamber 6 is provided for buoying the vessel 2.

A flexible discharge pipe 7 for the vessel 2 enters the outlet pipe 8 for the vessel 4. A cock 9 is provided at a point outside the vessel 4 for the pipe 7. Both pipes 7 and 8 may be fitted with non-return valves as illustrated at 10 and 11. The total discharge is controlled by the cock 12. A cover 13 is shown for the vessel 2. The cock 9 permits the ratio of the dimensions of the discharge apertures from the two vessels 2 and 4 to be varied to suit the requirements for maintaining various mixtures at constant strength.

A compressor 17 may be provided to apply pressure to the surface of either of the liquids 1 and 3 and for this purpose a cover 18 must be supplied for the vessel 4.

What I claim as new and desire to secure by Letters Patent is:

1. Apparatus for proportionably dosing a supply of a first liquid with a second or dosing liquid, comprising in combination, a vessel containing the supply of first liquid and through which the entire supply of liquid to be dosed must pass, the level of which liquid may vary under discharge or replenishment, a second vessel immersed in said supply in said first vessel, a supply of dosing liquid in said second vessel, said second vessel being of such buoyancy as to float therein and rise and fall in accordance with the level of said first named liquid supply and thus the pressure heads of both liquids vary substantially proportionately, a discharge conduit leading from said first named vessel, a discharge conduit leading from said second named vessel, a common discharge outlet with which both of said discharge conduits communicate, and means for varying at will the dimension of at least one of said discharge conduits and thus the rate of flow therethrough.

2. The dosing apparatus as set forth in claim 1 in which means are provided for exerting a pressure on the surface of the supply of liquid to be dosed.

3. The dosing apparatus as set forth in claim 2 in which means are provided for exerting a pressure on the surface of the supply of dosing liquid.

References Cited in the file of this patent

UNITED STATES PATENTS

| | | |
|---|---|---|
| 1,183,122 | Rollins | May 16, 1916 |
| 1,946,474 | Banks et al. | Feb. 13, 1934 |
| 1,966,658 | Wade | July 17, 1934 |
| 2,569,857 | Jaegle | Oct. 2, 1951 |
| 2,740,554 | Bekker | Apr. 3, 1956 |